(12) United States Patent
Li et al.

(10) Patent No.: US 8,594,037 B2
(45) Date of Patent: Nov. 26, 2013

(54) METHOD AND APPARATUS FOR ASSIGNING RESPONSE CHANNEL RESOURCES

(75) Inventors: Yingyang Li, Beijing (CN); Chengjun Sun, Beijing (CN); Xiaoqiang Li, Beijing (CN)

(73) Assignee: Samsung Electronics Co., Ltd. (KR)

( * ) Notice: Subject to any disclaimer, the term of this patent is extended or adjusted under 35 U.S.C. 154(b) by 100 days.

(21) Appl. No.: 13/371,988

(22) Filed: Feb. 13, 2012

(65) Prior Publication Data

US 2012/0207107 A1 Aug. 16, 2012

(30) Foreign Application Priority Data

Feb. 12, 2011 (CN) .......................... 2011 1 0037720

(51) Int. Cl.
*H04W 4/00* (2009.01)
(52) U.S. Cl.
USPC .......................... 370/329; 370/280; 370/281
(58) Field of Classification Search
None
See application file for complete search history.

(56) References Cited

U.S. PATENT DOCUMENTS

| | | | |
|---|---|---|---|
| 2010/0226326 A1 | 9/2010 | Ahn et al. | |
| 2011/0019776 A1* | 1/2011 | Zhang et al. ................. | 375/340 |
| 2011/0116454 A1* | 5/2011 | Chen et al. ................... | 370/329 |
| 2011/0128922 A1* | 6/2011 | Chen et al. ................... | 370/329 |
| 2011/0194500 A1 | 8/2011 | Kim et al. | |
| 2011/0243066 A1* | 10/2011 | Nayeb Nazar et al. ....... | 370/328 |
| 2012/0088533 A1* | 4/2012 | Khoshnevis et al. ......... | 455/509 |

FOREIGN PATENT DOCUMENTS

| | | |
|---|---|---|
| KR | 1020090075442 | 7/2009 |
| KR | 1020090097805 | 9/2009 |
| KR | 1020100039203 | 4/2010 |
| WO | WO 2010/044564 | 4/2010 |

* cited by examiner

*Primary Examiner* — David Oveissi
(74) *Attorney, Agent, or Firm* — The Farrell Law Firm, P.C.

(57) ABSTRACT

An apparatus and method for assigning an acknowledgement (ACK)/a negative acknowledgement (NACK) channel resources. The method includes setting a User Equipment (UE) to feed back Acknowledgement (ACK)/Negative Acknowledgement (NACK) information in a Carrier Aggregation (CA) mode; setting a Transmit Power Control (TPC) field of a Physical Downlink Controlling Channel (PDCCH) message to transmit an ACK/NACK Resource Indicator (ARI) information, when a Downlink Assigning Indicator (DAI) value of the PDCCH message of a Secondary cell (Scell) scheduled in a non cross-carrier manner is 1; setting the TPC field to transmit a TPC command for the ACK/NACK feedback information, when the DAI value is greater than 1; and transmitting the PDCCH message and downlink data to the UE.

10 Claims, 4 Drawing Sheets

METHOD AND APPARATUS FOR ASSIGNING RESPONSE CHANNEL RESOURCES

PRIORITY

This application claims priority under 35 U.S.C. §119(a) to Chinese Patent Application No. 201110037720.1, which was filed in the State Intellectual Property Office on Feb. 12, 2011, the entire content of which is incorporated herein by reference.

FIELD OF THE INVENTION

The present invention relates generally to wireless communication technology, and more particularly, to a method and an apparatus for assigning response channel resources.

BACKGROUND ART

A Long Term Evolution (LTE) system is based on Hybrid Automatic Repeat reQuest (HARQ) for data transmission. More specifically, based on data reception status, the data receiver in an LTE system will send receiving status feedback information, i.e., an ACKnowledgement (ACK) or a Negative ACKnowledgement (NACK). Scheduling information of dynamic downlink data is transmitted through a Physical Downlink Control CHannel (PDCCH), while for a Semi-Persistent Scheduling (SPS) service, because the scheduling information is sent through the PDCCH when the downlink data is retransmitted, it is not necessary to send PDCCH information in initial transmission scheduling information of the downlink data.

In an LTE Time Division Duplex (TDD) system, Downlink Assigning Indication (DAI) technology allows a User Equipment (UE) to determine whether PDCCH information sent by a Node B is lost or not. Specially, a DAI identifies PDCCH information of a next downlink sub-frame of a current bundling window. For example, 2 bits in a DAI field can indicate 4 values, easily identifying the PDCCH information when a size of a bundling window (M) is 1, 2, 3, or 4. However, when TDD configuration for uplink and downlink is 5, then M is 9. Accordingly, the 4 values of the DAI field need to be re-used. For example, when the number of a current PDCCH is a, its DAI value is obtained by modulo operation with 4, as shown in Equation (1).

$$mod(a-1,4)+1 \qquad (1)$$

In an LTE-Advanced (LTE-A) system, Carrier Aggregation (CA) technology is used to support higher transmission rates, i.e., at least three Component Carriers (CC) are aggregated to provide a larger work bandwidth. Based on the CA, a Node B sends downlink data to a UE using the at least three CCs. Accordingly, the UE provides ACK/NACK feedback information for downlink data of at least three CCs. Herein, each CC is referred to as a "cell".

According to current discussion for LTE-A, up to 4-bit ACK/NACK transmission is supported, based on channel selection technology. More specifically, a Frequency Division Duplex (FDD) system uses a 4-bit mapping table as shown in Table 1 below. In Table 1, ACK/NACK channels 1 and 2 correspond to two ACK/NACK bits of a Primary cell (Pcell), and ACK/NACK channels 3 and 4 correspond to two ACK/NACK bits of a Secondary cell (Scell). In Table 1, N means NACK, A means ACK, and D means Discontinuous Transmission (DTX). In Table 1, the feature is used that the two ACK/NACK channels of the same cell are always available or unavailable, thus the feedback performance and power controlling are optimized.

TABLE 1

|  |  | ACK/NACK channel | | | |
| --- | --- | --- | --- | --- | --- |
| Pcell | Scell | 1 | 2 | 3 | 4 |
| A, A | A, A |  |  | −1 |  |
| A, N | A, A |  |  |  | −j |
| N, A | A, A |  |  | −j |  |
| N, N | A, A |  |  |  | −1 |
| A, A | A, N |  | j |  |  |
| A, N | A, N |  |  |  | 1 |
| N, A | A, N |  | 1 |  |  |
| N, N | A, N |  |  |  | j |
| A, A | N, A |  |  | −1 |  |
| A, N | N, A |  |  | j |  |
| N, A | N, A |  |  |  | −j |
| N, N | N, A |  |  |  | 1 |
| A, A | N, N | −1 |  |  |  |
| A, N | N, N | j |  |  |  |
| N, A | N, N | −j |  |  |  |
| N, N | N, N | 1 |  |  |  |
| A, A | D, D | −1 |  |  |  |
| A, N | D, D | j |  |  |  |
| N, A | D, D | −j |  |  |  |
| N, N | D, D | 1 |  |  |  |
| D, D | A, A |  |  |  | −1 |
| D, D | A, N |  |  |  | j |
| D, D | N, A |  |  |  | 1 |
| D, D | N, N | No transmission | | | |
| D, D | D, D | No transmission | | | |

Another example of a 4-bit mapping table is shown in Table 2 below. In Table 2, a corresponding ACK/NACK channel is selected for transmission only when a certain piece of ACK/NACK information is an ACK. There is an exception, in that in order to fully use feedback capability of the M (M is 2, 3, or 4) channels, when a first piece of ACK/NACK information is a NACK and other pieces of ACK/NACK information are NACK or DTX, a Quadrature phase-shift keying (QPSK) constellation point of the first channel can function as an indication. Table 2 is used when the 4 ACK/NACK bits and their corresponding ACK/NACK channels are separated.

TABLE 2

| ACK/NACK information | | | | ACK/NACK channel | QPSK constellation point |
| --- | --- | --- | --- | --- | --- |
| b0 | b1 | b2 | b3 | | |
| D | N/D | N/D | N/D | DTX |  |
| N | N/D | N/D | N/D | h0 | 1 |
| A | N/D | N/D | N/D | h0 | −1 |
| N/D | A | N/D | N/D | h1 | −j |
| A | A | N/D | N/D | h1 | j |
| N/D | N/D | A | N/D | h2 | 1 |
| A | N/D | A | N/D | h2 | j |
| N/D | A | A | N/D | h2 | −j |
| A | A | A | N/D | h2 | −1 |
| N/D | N/D | N/D | A | h3 | 1 |
| A | N/D | N/D | A | h0 | −j |
| N/D | A | N/D | A | h3 | j |
| A | A | N/D | A | h0 | j |
| N/D | N/D | A | A | h3 | −j |
| A | N/D | A | A | h3 | −1 |
| N/D | A | A | A | h1 | 1 |
| A | A | A | A | h1 | −1 |

A method for ACK/NACK information feedback in an LTE-A TDD system based on channel selection is currently being discussed, which is based on the above-described DAI design of LTE. First, the ACK/NACK information corresponding to each PDCCH is sorted in ascending order according to the DAI. If there is an SPS service in the PDCCH, its ACK/NACK information is given priority. Thereafter, a number of consecutive ACKs starting from first ACK/NACK information is fed back to each cell.

More specifically, when the size of the bundling window M is 3, there are 4 possible values for the number of consecutive ACKs of each cell, that is, 0, 1, 2, or 3. Accordingly, these four values can be mapped to 2 bits, as the example shown in Table 3 below. When the size of the bundling window M is 4, there are 5 possible values for the number of consecutive ACKs of each cell, i.e., 0, 1, 2, 3, or 4. Here, these five values could be transferred to 4 states to be mapped to 2 bits. One of the transferring methods is shown in Table 4 below. In Table 4, N means NACK, A means ACK, D means DTX, and the symbol "/" means "or".

TABLE 3

| 3 pieces of ACK/NACK information at most in the bundling window | Mapping states |
| --- | --- |
| A, A, A | A, A |
| A, A, N/D | N/D, A |
| A, N/D, any | A, N/D |
| N, any, any | N, N/D |
| D, any, any | D, N/D |

TABLE 4

| 4 pieces of ACK/NACK information at most in the bundling window | Mapping states |
| --- | --- |
| A, A, A, N/D | A, A |
| A, A, N/D, any | N/D, A |
| A, A, A, A Or, A, D, D, D | A, N/D |
| N, any, any, any or, A, N/D, any, any except A, D, D, D | N, N/D |
| D, any, any, any | D, N/D |

According to the mapping states in Tables 3 and 4, 2-bit Pcell information and 2-bit Scell information are obtained, and ACK/NACK information could be fed back using the channel selection method according to the mapping of Table 1 or 2.

Allocating 4 candidate ACK/NACK channels for feeding back 4 bits information to support channel selection is also under discussion.

More specifically, for the ACK/NACK channel corresponding to the 2 bits of a Pcell, when there is SPS service, the first ACK/NACK channel is a semi-static configured ACK/NACK channel for SPS service, and the second ACK/NACK channel is determined by the PDCCH scheduling a Pcell with its DAI of 1. For example, if a minimum Control Channel Element (CCE) index of a PDCCH is n, one ACK/NACK channel could be mapped with the LTE method according to the CCE index n. When there is no SPS service, the two ACK/NACK channels are determined sequentially by PDCCHs of two Pcells with their DAIs of 1 and 2, respectively. For example, if the minimum CCE index of the PDCCH with its DAI value of 1 is n1 and the minimum CCE index of the PDCCH with its DAI value of 2 is n2, then the first ACK/NACK channel can be mapped with LTE method according to the CCE index n1, and one ACK/NACK channel can be mapped with LTE method according to the CCE index n2.

For the ACK/NACK channel corresponding to the 2 bits of an Scell, when cross-cell scheduling is used, the two ACK/NACK channels are sequentially determined by PDCCHs of two Pcells with their DAIs of 1 and 2, respectively. For example, if the minimum CCE index of the PDCCH with its DAI value of 1 is n1 and the minimum CCE index of the PDCCH with its DAI value of 2 is n2, then the first ACK/NACK channel can be mapped with the LTE method according to the CCE index n1, and the second ACK/NACK channel can be mapped with LTE method according to the CCE index n2. When no cross-cell scheduling is used, the two ACK/NACK channels are configured by a higher layer, and the ACK/NACK Resource Indicating information (ARI) in the PDCCH scheduling Scell is used to improve assigning flexibility.

According to the current LTE-A discussions, a power controlling command is still sent in a Transmit Power Control (TPC) field of the PDCCH scheduling Pcell, to ensure the Node B to control transmitting power of the UE. For the Scell using cross-carrier scheduling, a power controlling command is still sent in a TPC field of PDCCH scheduling Scell. For an Scell using non cross-carrier scheduling, a TPC field of PDCCH scheduling Scell is redefined as an ARI for indicating ACK/NACK channel resources, which means that the power controlling information cannot be carried in the TPC field. Accordingly, if the UE does not receive a PDCCH of a Pcell correctly, or the Node B does not currently schedule dynamic data in the Pcell, the UE will not receive the power controlling command, negatively affecting the reliability of ACK/NACK feedback information sent upstream.

SUMMARY OF THE INVENTION

Accordingly, the present invention is designed to address at least the problems and/or disadvantages described above and to provide at least the advantages described below.

Accordingly, an aspect of the present invention is to provide a method for assigning ACK/NACK channel resources, which improve the power controlling performance of uplink signal, while indicating the assigned ACK/NACK channel.

In accordance with an aspect of the present invention, a method is provided for allocating response channel resources by a Node B in a wireless communication system. The method includes setting a User Equipment (UE) to feed back Acknowledgement (ACK)/Negative Acknowledgement (NACK) information in a Carrier Aggregation (CA) mode; setting a Transmit Power Control (TPC) field of a Physical Downlink Controlling Channel (PDCCH) message to transmit an ACK/NACK Resource Indicator (ARI) information, when a Downlink Assigning Indicator (DAI) value of the PDCCH message of a Secondary cell (Scell) scheduled in a non cross-carrier manner is 1; setting the TPC field to transmit a TPC command for the ACK/NACK feedback information, when the DAI value is greater than 1; and transmitting the PDCCH message and downlink data to the UE.

In accordance with another aspect of the present invention, a method is provided for using response channel resources by a User Equipment (UE) in a wireless communication system. The method includes receiving a Physical Downlink Controlling Channel (PDCCH) message and downlink data from a Node B; generating ACK/NACK feedback information for the downlink data; determining an ACK/NACK channel corresponding to a Secondary cell (Scell) based on the PDCCH message scheduling the Scell with a DAI value of 1, and determining a transmitting power of the ACK/NACK feedback information based on the PDCCH message scheduling the Scell with a DAI value of greater than 1, when the Scell is scheduled in a non cross-carrier manner; and transmitting the ACK/NACK feedback information with the determined transmitting power using the determined ACK/NACK channel.

In accordance with another aspect of the present invention, a Node B is provided for allocating response channel resources in a wireless communication system. The Node B includes a setting unit for setting a User Equipment (UE) to feed back Acknowledgement (ACK)/Negative Acknowledgement (NACK) information in a Carrier Aggregation (CA) mode, setting a Transmit Power Control (TPC) field of a Physical Downlink Controlling Channel (PDCCH) message to transmit an ACK/NACK Resource Indicator (ARI) information, when a Downlink Assigning Indicator (DAI) value of the PDCCH message of a Secondary cell (Scell) scheduled in a non cross-carrier manner is 1, and setting the TPC field to transmit a TPC command for the ACK/NACK feedback information, when the DAI value is greater than 1; and a transmitter for transmitting the PDCCH message and downlink data to the UE.

In accordance with another aspect of the present invention, a User Equipment (UE) is provided that uses response channel resources in a wireless communication system. The UE includes a receiver for receiving a Physical Downlink Controlling Channel (PDCCH) message and downlink data from a Node B; a generator for generating ACK/NACK feedback information for the downlink data, and determining an ACK/NACK channel corresponding to a Secondary cell (Scell) based on the PDCCH message scheduling the Scell with a DAI value of 1, and determining a transmitting power of the ACK/NACK feedback information based on the PDCCH message scheduling the Scell with a DAI value of greater than 1, when the Scell is scheduled in a non cross-carrier manner; and a transmitter for transmitting the ACK/NACK feedback information with the determined transmitting power using the determined ACK/NACK channel.

BRIEF DESCRIPTION OF THE DRAWINGS

The above and other aspects, features, and advantages of certain embodiments of the present invention will be more apparent from the following detailed description when taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a method of allocating response channel resources, e.g., ACK/NACK channel resources, is provided.

Figure 1:
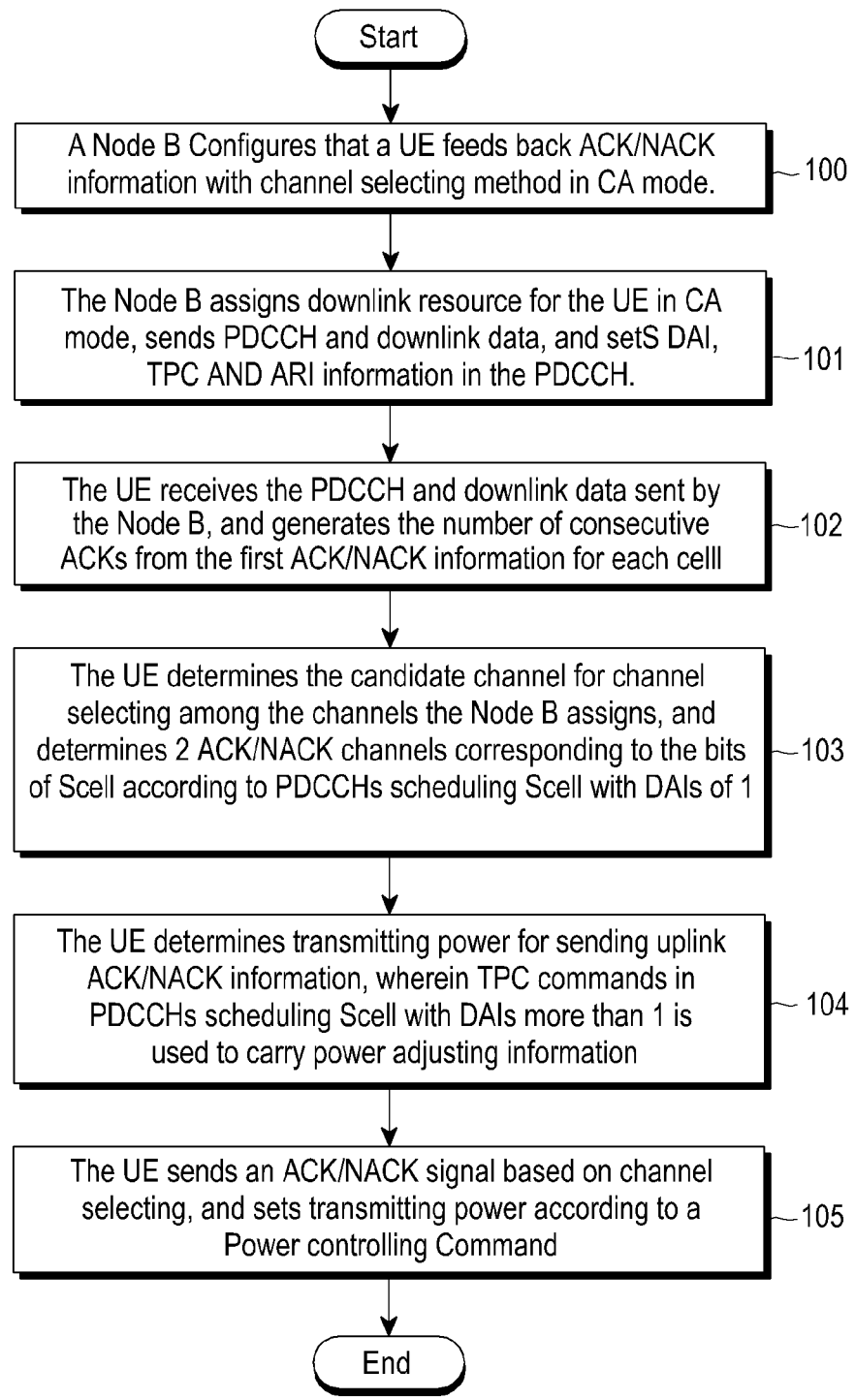
FIG. 1 is a flowchart illustrating a method for assigning ACK/NACK channel resources according to an embodiment of the present invention.

FIG. 1 is a flowchart illustrating a method for assigning ACK/NACK channel resources according to an embodiment of the present invention.

Referring to FIG. 1, there are two modes of feeding back ACK/NACK information for a UE configured to be in the CA mode in LTE: (1) separately feeding back ACK/NACK information of each sub-frame on each cell in a bundling window, in which the ACK/NACK information is transmitted based on Physical Uplink Control Channel (PUCCH) format 3; and (2) binding the ACK/NACK information in the bundling window on each cell to reduce the feedback overhead, in which the ACK/NACK information is transmitted based on PUCCH format 3, or based on the channel selection. FIG. 1 will be described below, in which the ACK/NACK information is transmitted based on the channel selection, i.e., the second mode.

The ARI processing of FIG. 1 also fits to the situation that ACK/NACK information is transmitted based PUCCH format 3.

Referring to FIG. 1, in step 100, according to a factor of the channel status of the UE or of the service requirement, the Node B configures that the ACK/NACK feedback mode the UE uses in the CA mode is based on channel selection using Radio Resource Control (RRC) signalling.

In step 101, a Node B scheduler assigns downlink channel resources on a Pcell and an Scell for the UE in the CA mode, and sends PDCCH information and corresponding dynamic data or sends service data of SPS. More specifically, the Node B puts DAI information in each piece of PDCCH information using the DAI method defined in LTE, which indicates the number of PDCCH sent by the Node B in the bundling window up to the current sub-frame. When the size of the bundling window is 9, the number of PDCCH is modelled by 4. When M is 2, 3, or 4, the DAI acts essentially as a counter for counting the number of PDCCHs from 1.

In accordance with an embodiment of the present invention, the TPC field in PDCCH scheduling Pcell carries a TPC command when the Node B sends PDCCH information, and when Scell is scheduled in a cross-carrier manner, the TPC field in a PDCCH scheduling an Scell also carries a TPC command. When the Scell is scheduled in a non cross-carrier manner, the TPC field in a PDCCH scheduling an Scell with a DAI of 1 is redefined as an ARI, while the TPC field in a PDCCH scheduling an Scell with a DAI of more than 1 still carries a TPC command.

In step 102, the UE receives PDCCH information sent by the Node B, and corresponding dynamic downlink data. Thereafter, the UE generates ACK/NACK feedback information.

Specially, when the Node B sends the downlink data with Multi Input Multi Output (MIMO), one bit of the 2-bit ACK/NACK information of a sub-frame is determined with spatial bundling. Using spatial bundling, the ACK/NACK information is bound as ACK when both of the two bits are ACKs; otherwise, the ACK/NACK information is bound as NACK.

Thereafter, ACK/NACK information corresponding to each of the PDCCH channels feeding back ACK/NACK information is sorted in ascending order. If there is an SPS service in the PDCCH, its ACK/NACK information is given priority. Four feedback states are generated for each cell, which are mapped to 2-bit ACK/NACK information. Here, it is assumed that each feedback state represents the number of consecutive ACKs from the first ACK/NACK information, e.g., using the methods shown in Table 3 and Table 4.

In step 103, the UE determines candidate channels to perform channel selection.

More specifically, for an ACK/NACK channel corresponding to 2 bits of a Pcell, when there is an SPS service, the first ACK/NACK channel is a semi-static configured ACK/NACK channel for the SPS service, and the second ACK/NACK channel is determined by a PDCCH scheduling a Pcell with its DAI of 1. For example, if a minimum CCE index of a PDCCH is n, an ACK/NACK channel can be mapped with an LTE method according to the CCE index n.

When there is no SPS service, the two ACK/NACK channels are sequentially determined by PDCCHs of two Pcells with DAIs of 1 and 2, respectively. For example, if the minimum CCE index of the PDCCH with its DAI value of 1 is n1 and the minimum CCE index of the PDCCH with its DAI value of 2 is n2, then the first ACK/NACK channel can be mapped with the LTE method according to the CCE index n1, and the second ACK/NACK channel could be mapped with LTE method according to the CCE index n2.

For the ACK/NACK channel corresponding to the 2 bits of an Scell, when cross-cell scheduling is used, the two ACK/NACK channels are sequentially determined by PDCCHs of two Pcells with DAIs of 1 and 2, respectively. For example, if the minimum CCE index of the PDCCH with a DAI value of 1 is n1 and the minimum CCE index of the PDCCH with a DAI value of 2 is n2, then the first ACK/NACK channel can be mapped with the LTE method according to the CCE index n1, and one ACK/NACK channel could be mapped with the LTE method according to the CCE index n2.

When no cross-cell scheduling is used, the two ACK/NACK channels are configured by a higher layer, and ARI information in a PDCCH scheduling an Scell and with a DAI of 1 is used to indicate the two ACK/NACK channels.

For an Scell scheduled with an uncross-cell, according to the method of feeding back the number of consecutive ACKs from the first piece of ACK/NACK information of step 102, when the number of consecutive ACKs is no less than 1, the UE receives the PDCCH with a DAI of 1. Thereafter, according to the setting method in step 101, the UE can receive two candidate ACK/NACK channels with ARI information from the redefined TPC field in this PDCCH. When the first piece of ACK/NACK information is DTX, i.e., the Node B sent a PDCCH with a DAI of 1, but the UE has not detected this PDCCH correctly, then the UE has no available ARI information. However, because the design of channel selection mapping table ensures that there is no possibility to choose candidate ACK/NACK channels corresponding to an Scell in this situation, sending uplink ACK/NACK feedback information is not affected.

In step 104, the UE determines transmitting power when ACK/NACK signal is sent in the uplink direction, based on a received TPC command. For example, the transmitting power of the uplink controlling channel can be determined as shown in Equation (2).

$$P_{PUCCH}(i) = g(i) + P_{others} \quad (2)$$

In Equation (2), g(i) represents the transmitting power adjusting value in the uplink sub-frame i, which is determined based on the TPC command, and $P_{others}$ represents other information for determining the transmitting power.

When the transmitting power of the uplink controlling channel is determined in an accumulation manner, the transmitting power adjusting value g(i) can be determined using Equation (3).

$$g(i) = g(i-1) + \sum_{k_m=0}^{M-1} \delta_{PUCCH}(i - k_m) \quad (3)$$

Alternatively, when the transmitting power of the uplink controlling channel is not determined in an accumulation manner, the transmitting power adjusting value g(i) can be determined using Equation (4).

$$g(i) = \sum_{k_m=0}^{M-1} \delta_{PUCCH}(i - k_m) \quad (4)$$

In Equations (3) and (4), M is the size of the bundling window, $\delta_{PUCCH}(i-k_m)$ is the transmitting power controlling value indicated by the TPC command sent by the PDCCH in the downlink sub-frame $i-k_m$, and $k_m$ refers to each downlink sub-frame transmitted in a same uplink sub-frame. According to this definition, g(i) in the uplink sub-frame i equals the sum of the transmitting power adjusting value in the sub-frame i−1 and transmitting power controlling values of all the PDCCHs sent in the downlink bundling window corresponding to the uplink sub-frame.

In accordance with an embodiment of the present invention, when both of the two cells in the same downlink sub-frame send power controlling commands, these two power controlling commands repeatedly indicate the same value, and the reliability of the TPC command is enhanced. That is, if the UE does not detect the PDCCH on one of the cells, it can still receive the transmitting power controlling value of this sub-frame form the TPC field of the PDCCH of another cell. Thereafter, a sum of the TPC field values of PDCCHs are separately sent in each downlink sub-frame in the bundling window corresponding to an uplink sub-frame. Alternatively, the TPC field values of PDCCHs sent in each downlink sub-frame in the bundling window corresponding to a uplink sub-frame separately indicate the transmitting power controlling value of this uplink sub-frame. That is, all of the TPC fields of PDCCHs can repeatedly indicate a same value. Accordingly, when the UE receives a PDCCH, the UE will receive complete power controlling information, improving the reliability of the TPC command.

In accordance with an embodiment of the present invention, the PDCCH for indicating the TPC value includes: TPC commands of the PDCCHs scheduling Pcells, TPC commands of the PDCCHs scheduling Scells when the Scells are scheduled with a cross-carrier; and TPC commands of the PDCCHs scheduling Scell with DAI values of more than 1, when the Scells are scheduled with a non cross-carrier.

Thus, when both of the cells in a downlink sub-frame send a power transmitting command, if the UE does not detect PDCCH in one of the cells, the UE can still get the TPC value of the sub-frame from the TPC field of the PDCCH in another cell. If only an Scell is currently scheduled by the Node B and the non cross-carrier scheduling method is used, as long as the Node B schedules at least 2 downlink data transmissions on the Scell, the Node B can send a valid TPC command to the UE, thereby avoiding degradation of uplink transmitting performance caused by lack of an available TPC command for the UE.

As described above, the UE generates 2-bit information to be fed back by each cell, and determines the corresponding ACK/NACK channel and the uplink power adjusting value. Thus, in step 105 the UE can send ACK/NACK information in the uplink direction with ACK/NACK information transmitting method based on the channel selection, and can set suitable transmitting power according to the uplink power adjusting value. The method of FIG. 1 is not limited to the channel selection mapping table used herein. For example, a mapping table like Table 1 or 2 may also be used.

Figure 2:
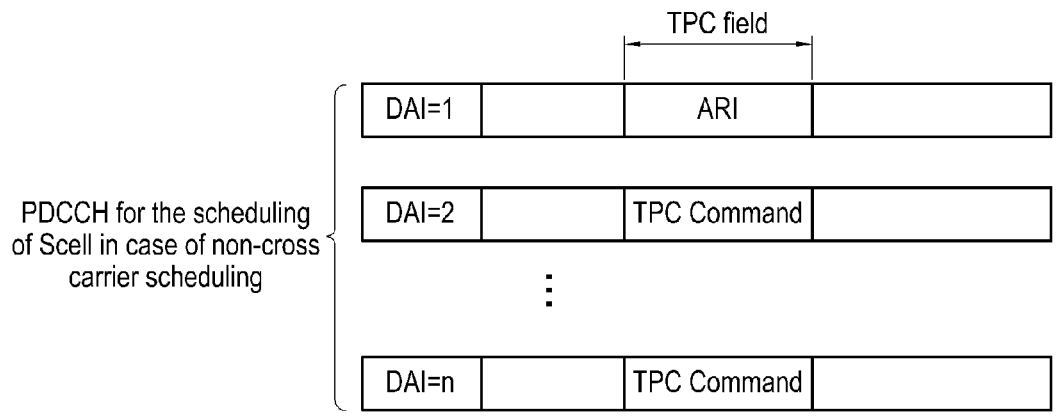
FIG. 2 illustrates a TPC field in a PDCCH for scheduling an Scell for non-cross carrier scheduling according to an embodiment of the present invention.

FIG. 2 illustrates a TPC field in a PDCCH for scheduling an Scell for non-cross carrier scheduling according to an embodiment of the present invention.

Referring to FIG. 2, as described in step 101 above, when an Scell is scheduled in a non cross-carrier manner, the TPC field in a PDCCH scheduling an Scell with a DAI of 1 is redefined as an ARI, while the TPC field in the PDCCH scheduling the Scell with a DAI greater than 1 still carries a TPC command.

Figure 3:
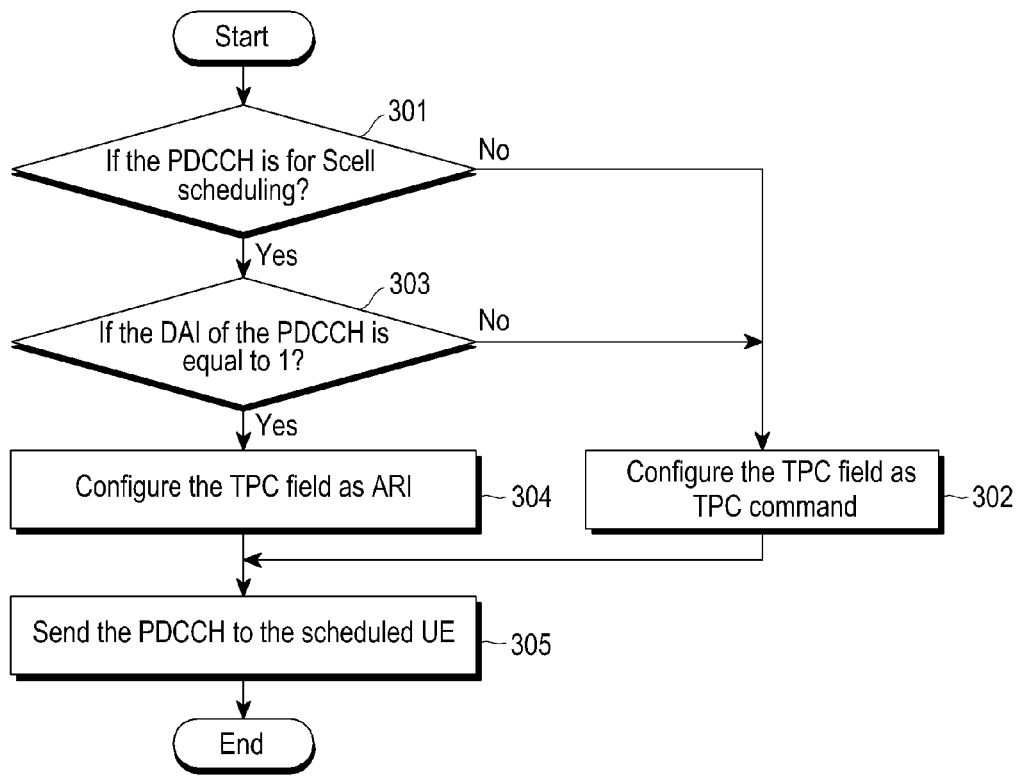
FIG. 3 is a flowchart illustrating eNB procedures for a TPC configuration according to an embodiment of the present invention.

FIG. 3 is a flowchart illustrating eNB procedures for a TPC configuration according to an embodiment of the present invention.

Referring to FIG. 3, in step 301, the eNB determines if a PDCCH is for Scell scheduling. When the PDCCH is not for Scell scheduling, i.e., it is for Pcell scheduling, then eNB configures the TPC field in the PDCCH as a TPC command in step 302.

However, when the PDCCH is for Scell scheduling, then eNB determines if the DAI of the PDCCH is equal to 1 in step 303. If the DAI of the PDCCH is not equal to 1, the eNB configures the TPC field in the PDCCH as a TPC command in step 302. However, the DAI of the PDCCH is equal to 1, the eNB configures the TPC field as an ARI in step 304.

In step 305, eNB configures the TPC field in the PDCCH, and then sends the PDCCH to the scheduled UE.

Figure 4:
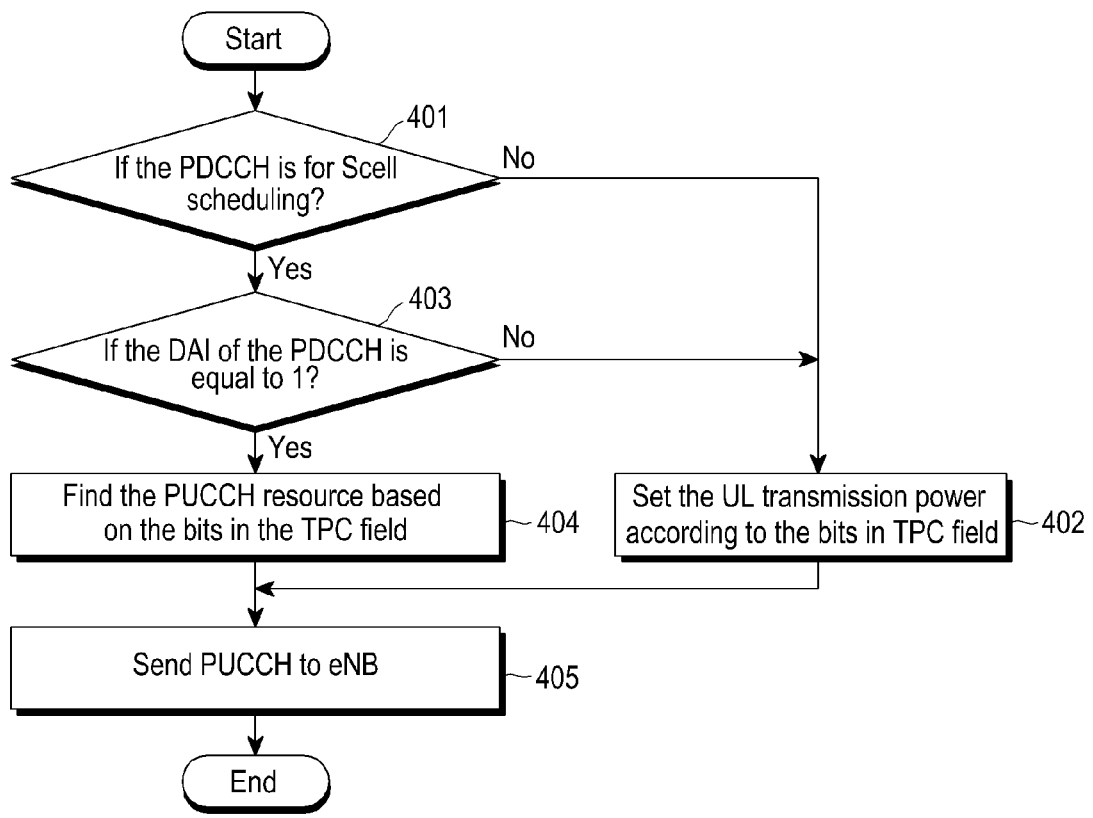
FIG. 4 is a flowchart illustrating UE procedures for TPC and UL resource allocation according to an embodiment of the present invention.

FIG. 4 is a flowchart illustrating UE procedures for TPC and UL resource allocation according to an embodiment of the present invention.

Referring to FIG. 4, in step 401, UE checks if the decoded PDCCH is for Scell scheduling. When the decoded PDCCH is not for Scell scheduling, i.e., it is for Pcell scheduling, the UE calculates the UpLink (UL) transmission power according to the bits in the TPC field of the PDCCH in step 402. However, when the decoded PDCCH is for Scell scheduling, the UE determines if the DAI of the PDCCH is equal to 1 in step 403.

When the DAI of the PDCCH is not equal to 1, the UE calculates the UL transmission power according to the bits in the TPC field of the PDCCH in step 402. However, when the DAI of the PDCCH is equal to 1, in step 404, the UE identifies the UL PUCCH resource according to the bits transmitted in the TPC field of the PDCCH which is used for an ARI.

In step 405, the UE sends the PUCCH to eNB.

Although FIGS. 3 and 4 assume that the size of the bundling window M is 2, 3 or 4, and that 2-bit DAI information can indicate uniquely the PDCCH sent by each Node B, these methods can also be used for M greater than 4, e.g., if TDD uplink and downlink configuration is 5, and there is no other restriction, i.e., M is 9.

When an Scell is scheduled with a non cross-carrier, the TPC of a PDCCH scheduling an Scell with a DAI value of 1 is redefined as an ARI, and the TPC of another PDCCH scheduling an Scell with a DAI value greater than 1 carries the TPC command. Here, in the bundling window, there can be a plurality of PDCCHs scheduling Scell with DAIs of 1. Because in extreme cases, the UE may lose a PDCCH with a DAI of 1 sent by a certain Node B, and the UE cannot find the problem by DAI, in order to avoid the situation that there is no ARI information for the UE, each of a plurality of TPC commands of PDCCHs scheduling Scell with their DAIs of 1 sent in the bundling window are redefined as an ARI.

In order to reduce ACK/NACK resource overhead, the Node B can repeatedly send the same ARI information on a plurality of PDCCHs for scheduling Scell with DAIs of 1. Alternatively, the Node B can send different ARI information on the plurality of PDCCHs for scheduling Scell with DAIs of 1, and a candidate channel should be defined when the plurality of PDCCHs received by the UE indicate different ARIs, which schedule an Scell and have DAIs of 1. For example, a channel indicated by an ARI of a first PDCCH received by a UE, which schedules an Scell and is has a DAI of 1, can be defined as the candidate channel.

Figure 5:
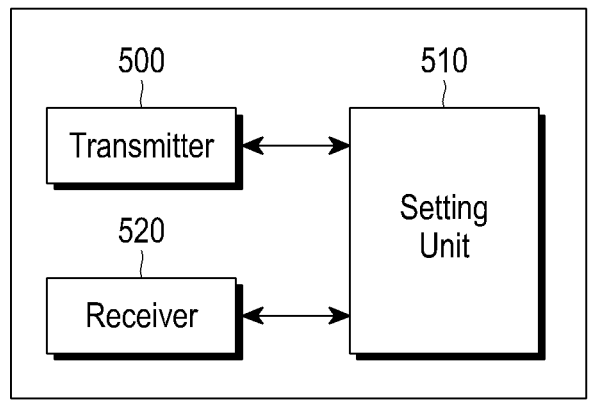
FIG. 5 is a block diagram illustrating a Node B apparatus for allocating ACK/NACK channel resources according to an embodiment of the present invention.

FIG. 5 is a block diagram illustrating a Node B apparatus for allocating ACK/NACK channel resources according to an embodiment of the present invention.

Referring to FIG. 5, a Node B apparatus includes a transmitter 500, a setting unit 510, and a receiver 520. Because an operation of allocating ACK/NACK channel resources by a Node B has been described with reference to FIGS. 1 and 2 above, only a brief operation for each element will be described below.

The setting unit 510 controls the UE to feedback ACK or NACK information in a CA mode. Specifically, the setting unit 510 sets the TPC field of the PDCCH message to transmit ARI information, when a DAI value of a PDCCH message of a scheduled Scell in a non cross-carrier manner is 1, and the setting unit 510 sets the TPC field to transmit the TPC command, when the DAI value is greater than 1. The set PDCCH and downlink data are transmitted to the UE through the transmitter 520. Thereafter, ACK/NACK feedback information for the downlink data is received through the receiver 520.

Figure 6:
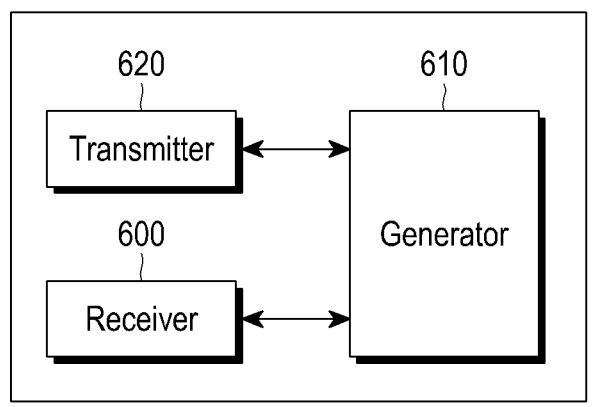
FIG. 6 is a block diagram illustrating a UE apparatus that uses allocated ACK/NACK channel resources according to an embodiment of the present invention.

FIG. 6 is a block diagram illustrating a UE apparatus that uses allocated ACK/NACK channel resources according to an embodiment of the present invention.

Referring to FIG. 6, a UE apparatus includes a receiver 600, a generator 610, and a transmitter 620. Because an operation of using allocated ACK/NACK channel resources by the UE has been described with reference to FIG. 6 above, only a brief operation for each element will be described hereinafter.

The receiver 600 receives downlink data and a PDCCH message transmitted from a Node B. The generator 610 generates ACK/NACK feedback information for each of the downlink data. Specifically, when the generator 610 generates the ACK/NACK feedback information, the generator 610 simultaneously determines two ACK/NACK channels corresponding to the Scell according to the PDCCH message scheduling the Scell with a DAI value of 1, and determines transmitting power of the ACK/NACK feedback information according to the PDCCH message scheduling the Scell with a DAI value of greater than 1, if the Scell is scheduled in a non cross-carrier manner. Thereafter, the ACK/NACK feedback information is transmitted using the determined ACK/NACK channels and transmitting power through the transmitter 620.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of allocating response channel resources by a Node B in a wireless communication system, the method comprising:
    setting a User Equipment (UE) to feed back Acknowledgement (ACK)/Negative Acknowledgement (NACK) information in a Carrier Aggregation (CA) mode;
    setting a Transmit Power Control (TPC) field of a Physical Downlink Controlling Channel (PDCCH) message to transmit an ACK/NACK Resource Indicator (ARI) information, when a Downlink Assigning Indicator (DAI) value of the PDCCH message of a Secondary cell (Scell) scheduled in a non cross-carrier manner is 1;
    setting the TPC field to transmit a TPC command for the ACK/NACK feedback information, when the DAI value is greater than 1; and
    transmitting the PDCCH message and downlink data to the UE.

2. The method of claim 1, further comprising:
    setting a TPC field of a PDCCH message scheduling a Primary cell (Pcell) to transmit a TPC command; and
    transmitting the PDCCH message.

3. The method of claim 1, further comprising:
    setting a TPC field of a PDCCH message of a Scell scheduled in a cross-carrier manner to transmit a TPC command; and
    transmitting the PDCCH message.

4. The method of claim 1, wherein, when a size of a bundling window is greater than 4, ARI information transmitted in TPC fields of a plurality of PDCCH messages for scheduling the Scell with their DAI values of 1 are equal.

5. A method of transmitting Acknowledgement (ACK)/ Negative Acknowledgement (NACK) information using response channel resources by a User Equipment (UE) in a wireless communication system, the method comprising:
    receiving a Physical Downlink Controlling Channel (PDCCH) message and downlink data from a Node B;
    generating ACK/NACK feedback information for the downlink data;
    determining an ACK/NACK channel corresponding to a Secondary cell (Scell) based on the PDCCH message scheduling the Scell with a DAI value of 1, and determining a transmitting power of the ACK/NACK feedback information based on the PDCCH message scheduling the Scell with a DAI value of greater than 1, when the Scell is scheduled in a non cross-carrier manner; and
    transmitting the ACK/NACK feedback information with the determined transmitting power using the determined ACK/NACK channel.

6. A Node B for allocating response channel resources in a wireless communication system, the Node B comprising:
    a setting unit for setting a User Equipment (UE) to feed back Acknowledgement (ACK)/Negative Acknowledgement (NACK) information in a Carrier Aggregation (CA) mode, setting a Transmit Power Control (TPC) field of a Physical Downlink Controlling Channel (PDCCH) message to transmit an ACK/NACK Resource Indicator (ARI) information, when a Downlink Assigning Indicator (DAI) value of the PDCCH message of a Secondary cell (Scell) scheduled in a non cross-carrier manner is 1, and setting the TPC field to transmit a TPC command for the ACK/NACK feedback information, when the DAI value is greater than 1; and
    a transmitter for transmitting the PDCCH message and downlink data to the UE.

7. The Node B of claim 6, wherein the setting unit sets a TPC field of a PDCCH message scheduling a Primary cell (Pcell) to transmit a TPC command.

8. The Node B of claim 6, wherein the setting unit sets a TPC field of a PDCCH message of a Scell scheduled in a cross-carrier manner to transmit a TPC command.

9. The Node B of claim 6, wherein, when a size of a bundling window is greater than 4, ARI information transmitted in TPC fields of a plurality of PDCCH messages for scheduling the Scell with their DAI values of 1 being the same.

10. A User Equipment (UE) for transmitting Acknowledgement (ACK)/Negative Acknowledgement (NACK) information using response channel resources in a wireless communication system, the UE comprising:
    a receiver for receiving a Physical Downlink Controlling Channel (PDCCH) message and downlink data from a Node B;
    a generator for generating ACK/NACK feedback information for the downlink data, and determining an ACK/NACK channel corresponding to a Secondary cell (Scell) based on the PDCCH message scheduling the Scell with a DAI value of 1, and determining a transmitting power of the ACK/NACK feedback information based on the PDCCH message scheduling the Scell with a DAI value of greater than 1, when the Scell is scheduled in a non cross-carrier manner; and
    a transmitter for transmitting the ACK/NACK feedback information with the determined transmitting power using the determined ACK/NACK channel.

* * * * *